US006938037B2

(12) United States Patent
Severino et al.

(10) Patent No.: US 6,938,037 B2
(45) Date of Patent: Aug. 30, 2005

(54) METHOD AND APPARATUS FOR DATA STORAGE AND RETRIEVAL

(75) Inventors: Donna M. Severino, Brooklyn, NY (US); Thomas B. Zingale, Pomona, NY (US); Karl E. Carlstrom, West Windsor, NJ (US); Faith M. Saunders, London (GB)

(73) Assignee: Goldman Sachs & Co., New York, NY (US)

( * ) Notice: Subject to any disclaimer, the term of this patent is extended or adjusted under 35 U.S.C. 154(b) by 135 days.

(21) Appl. No.: 09/944,055

(22) Filed: Aug. 31, 2001

(65) Prior Publication Data

US 2003/0046288 A1 Mar. 6, 2003

(51) Int. Cl.[7] ............................................... G06F 17/30
(52) U.S. Cl. ........................... 707/4; 707/102; 713/200
(58) Field of Search ............................. 707/4, 102, 3, 707/5, 6, 7, 8, 9, 10, 100, 103, 517; 713/200; 382/202, 306; 709/217

(56) References Cited

U.S. PATENT DOCUMENTS

| | | | | | |
|---|---|---|---|---|---|
| 5,201,047 | A | * | 4/1993 | Maki et al. ..................... | 707/4 |
| 5,293,429 | A | * | 3/1994 | Pizano et al. ............... | 382/202 |
| 5,784,562 | A | * | 7/1998 | Diener ........................ | 709/217 |
| 6,141,659 | A | * | 10/2000 | Barker et al. ............... | 707/102 |
| 6,236,768 | B1 | * | 5/2001 | Rhodes et al. .............. | 382/306 |
| 6,252,858 | B1 | * | 6/2001 | Inoue .......................... | 370/254 |
| 6,289,460 | B1 | * | 9/2001 | Hajmiragha ................ | 713/200 |
| 6,457,018 | B1 | * | 9/2002 | Rubin ............................ | 707/4 |
| 6,477,537 | B2 | * | 11/2002 | Gustman .................... | 707/102 |
| 2001/0042083 | A1 | * | 11/2001 | Saito et al. ................. | 707/517 |

OTHER PUBLICATIONS

Medina, Richard and Anders, Bob; "Assessment of Kofax VirtualReScan", Marketfocus Report (©2001 Duculabs) 16 pages.
Ascent Capture: "Using the Internet for Distributed Capture: Cost and Architecture Issues", Kofax Image Products, May 2001—11 pages
Ascent Capture: "The Operating System of Capture", Kofax—2 pages, no date.

* cited by examiner

*Primary Examiner*—Charles Rones
(74) *Attorney, Agent, or Firm*—Buckley, Maschoff & Talwalkar LLC

(57) ABSTRACT

A system, method, apparatus, and computer program code for data storage and retrieval. According to some embodiments, data storage pursuant to the present invention includes receiving document information associated with a document to be stored. A pending record containing the document information is generated. The document information is verified, and an active record is generated if the verifying is successful.

25 Claims, 9 Drawing Sheets

| TEMPLATE IDENTIFIER 502 | COLLECTION 504 | FILENAME 506 |
|---|---|---|
| T001 | DEFAULT | T001.HTML |
| T002 | CONTRACTS - CONFIDENTIALITY | T002.HTML |
| T003 | CONTRACTS - SOFTWARE AGREEMENTS | T003.WD |
| T004 | CONTRACTS - EMPLOYMENT AGREEMENTS | T004.HTML |

FIG. 5

| RECORD IDENTIFIER 602 | COLLECTION NAME 604 | FILE NAME 606 | PRIMARY SUBCATEGORY 608 | SECONDARY SUBCATEGORY 610 | TERTIARY SUBCATEGORY 612 | LOCATION INFORMATION 614 | CREATION INFORMATION 616 | MEDIA TYPE 618 | ARCHIVE INFORMATION 620 |
|---|---|---|---|---|---|---|---|---|---|
| D0001 | CONTRACTS - VENDOR | BETA TEST | MICROSOFT CORPORATION | EXECUTED TEST AGREEMENT | DEAD | ARCHIVED; IRON MTN (BX 111-111) | JOE DOE, ESQ.; 1/1/98; NYLEGAL | PAPER | DESTROY 1/1/2008 |
| D0002 | CONRACTS - VENDOR | CLIENT ACCESS | MICROSOFT CORPORATION | EX. CLIENT ACCESS AGMT | FINANCIAL PRODUCT | NY; 21 FLR, RM 2101; SHELF | JOE DOE, ESQ.; 5/1/01; NYLEGAL | D0002.PDF; PAPER | DESTROY 5/1/2011 |
| D0003 | CONTRACTS - CONFIDENTIALITY | SMALL CO. | CONFIDENTIALITY AGREEMENT | EXECUTED AGREEMENT | 2000 (12-27) | SHELF | 12/27/2000 | D0003.PDF; D0003.DOC | |
| D0004 | CONTRACTS - CONFIDENTIALITY | LARGE CO. | CONFIDENTIALITY AGREEMENT | EXECUTED AGREEMENT | 2001 | LONDON; SHELF | 1/1/2001 | D0004.DOC; PAPER | DESTROY 1/1/2011 |
| D0005 | CONTRACTS - EMPLOYEE | JOHN DOE | EMPLOYMENT AGREEMENT | UNSIGNED AGREEMENT | | HR; SHELF | 1/1/1998 | PAPER | |

METHOD AND APPARATUS FOR DATA STORAGE AND RETRIEVAL

FIELD OF THE INVENTION

The present invention relates to data storage and retrieval systems. More particularly, embodiments of the present invention relate to data storage and retrieval systems for records management.

BACKGROUND OF THE INVENTION

For years, pundits have predicted the coming of the paperless office; an office environment in which there is no longer a need for expensive, messy, and disorganized paper files and records. This utopian ideal has never materialized. Instead, businesses may be even more reliant on paper files and archives than in the past. This is particularly true in businesses which have multiple offices and which generate a large number of original documents such as signed contracts, compliance documents, or the like. In a business that generates a number of contracts, for example, it can be quite difficult to file and store the original document (or a facsimile thereof) in a manner allowing it to be readily located and retrieved days, if not years, later.

A typical records management system may consist of a paper filing system which stores each document in a logical manner, e.g., contracts may be filed by date, by contracting party, or by subject matter. The paper filing system may be supplemented with one or more databases which are used to provide further information about each document and to allow electronic searching for information entered in the database.

Such approaches, however, do not allow businesses to efficiently and accurately store, and subsequently retrieve and identify, all relevant documents. Existing systems are particularly unsuited for use in businesses having multiple offices or locations which desire to store and retrieve documents from each location. Often, each location of a business implements its own records management system. Each location often uses its own data storage and retrieval conventions, making it difficult (if not impossible) to share document information between locations.

It would be desirable to provide a system and method which may be utilized to store, catalog, and retrieve documents from multiple locations of a business. It would further be desirable to provide a system and method which allows integration with existing document management databases and document generation and management systems. It would further be desirable to provide a system and method which allows the storage, retrieval and control of document images along with paper copies of documents.

SUMMARY OF THE INVENTION

Embodiments of the present invention provide a system, method, apparatus, and computer program code for data storage and retrieval. According to some embodiments, data storage pursuant to the present invention includes receiving document information associated with a document to be stored. A pending record containing the document information is generated. The document information is verified, and an active record is generated if the verifying is successful. In some embodiments, at least part of the document information is received from a document generation system. In some embodiments, the document information is received from a user providing data identified by a template, where the template is identified based on a type of the document to be stored.

In some embodiments, document retrieval pursuant to the present invention includes receiving information associated with a desired document. A record of a document management database containing the information is identified. A physical location of the document is identified based on the record. A location of an image of the document is identified based on the record as well. Other information from the record is displayed.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 5 is a tabular representation of a portion of a template database according to an embodiment of the present invention, FIG. 6 is a tabular representation of a portion of a document management database according to an embodiment of the present invention;

FIG. 9 is an illustration of a user interface associated with a data storage and retrieval system according to some embodiments of the present invention.

DETAILED DESCRIPTION

Applicants have recognized that there is a need for a system, method, apparatus, and computer program code for data storage and retrieval which overcomes drawbacks of existing systems and approaches. Features of embodiments of the present invention will now be described with a system overview, a description of an embodiment of a system architecture, and processes pursuant to some embodiments of the present invention.

System Overview

Figure 1:
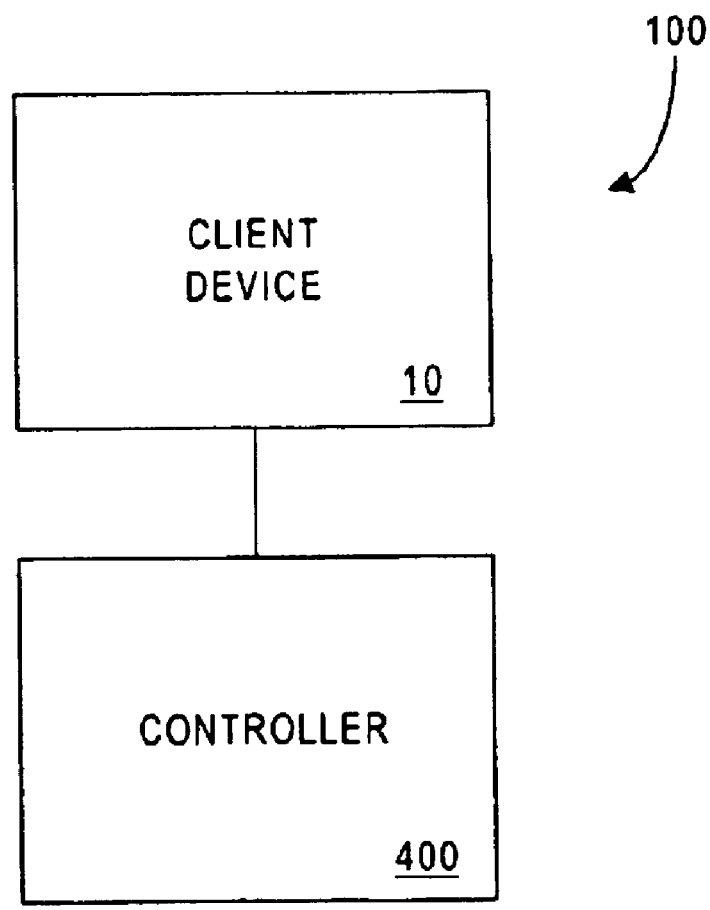
FIG. 1 is a block diagram overview of a data storage and retrieval system according to an embodiment of the present invention.

Reference is now made to the drawings, beginning at FIG. 1, where a block diagram of a data storage and retrieval system 100 according to an embodiment of the present invention is shown. As depicted in FIG. 1, data storage and retrieval system 100 includes a controller 400 in communication with a client device 10. For example, a user may input information associated with a document via client device 10. Client device 10 may then transmit appropriate information to controller 400, which in turn may store or retrieve document information based on the information received from client device 10.

For example, a user operating client device 10 may interact with controller 400 to input new document information to create a new record of information about the document (and, in some embodiments, to associate the record with one or more document images). The user may also operate client device 10 to interact with controller 400 to search for, locate, and retrieve document information stored in the system (including, in some embodiments, one or more document images). Further, the user may also interact with the system to retrieve document images or to locate and/or retrieve physical documents which have been stored using embodiments of the present invention.

Figure 2:
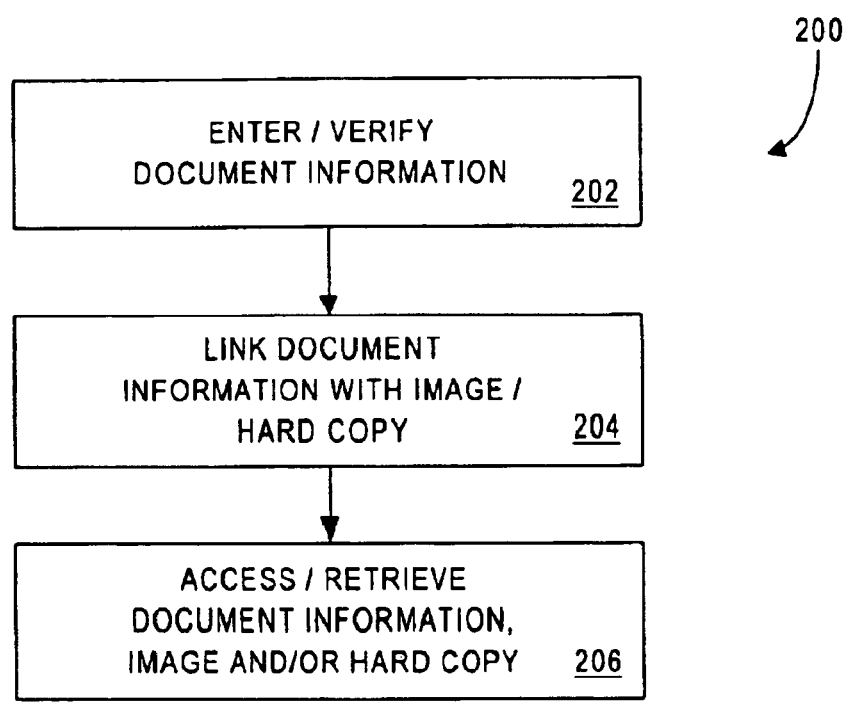
FIG. 2 is a flow chart of a method according to some embodiments of the present invention.

FIG. 2 is a flow chart of a method according to some embodiments of the present invention. The flow chart in FIG. 2 and the flow charts in other figures described herein do not imply a fixed order to the steps, and embodiments of the present invention can be practiced in any order that is practicable. The method shown in FIG. 2 may be performed, for example, by the data storage and retrieval system controller 400.

Process 200 begins at 202 where document information is entered and verified. Processing at 202 may be performed by one or more users operating client devices 10 and interacting with controller 400. For example, a user in a company's legal department may wish to input information about a new contract entered into by the company. In the example, the user may enter information about the contract, including information identifying a particular classification or collection into which the contract is to be classified, the name of the contract, various categories in which the contract should be categorized, and other information particularly identifying the contract so that it may be accurately classified, categorized and indexed for ready retrieval in the future.

Other information identifying the origin, owner, location, and archival information associated with the contract may also be entered. This document information is utilized, in some embodiments, to generate a pending record in a database accessible by data storage and retrieval system controller 400. In some embodiments, a data verification step is also performed (e.g., in conjunction with or subsequent to processing at 202) before an active record is generated for the document. In some embodiments, this data verification is performed by one or more records administrators operating client devices 10 and interacting with a pending record database accessible by data storage and retrieval system controller 400.

Processing continues at 204 where the document information entered at 202 is linked or otherwise associated with one or more document images and/or one or more hard copies of the document. Processing at 204 may, for example, be performed under the control of a user operating client device 10 and interacting with controller 400. Further, in some embodiments where document images are linked at 204, processing may also involve interaction with one or more scanning or imaging devices which are operated to generate document images for association with the document information entered at 204.

According to some embodiments of the present invention, document images may be easily and accurately linked to document information, allowing ready access, indexing and retrieval of document information and images. In some embodiments, processing at 204 includes identifying a physical location of one or more hard copies of the document. This is particularly useful, for example, in environments where an entity has multiple offices which maintain documents. In such an example, processing at 204 may include identifying a physical location (e.g., the particular office and even the particular shelf) where a document is located.

Processing continues at 206 where users operating client devices 10 may interact with controller 400 to access/retrieve document information, images and/or hard copies. Embodiments of the present invention collect, verify and store information in a manner which allows ready identification, location and retrieval of document information, document images and copies of documents, even in environments where documents are generated and stored in multiple geographically diverse locations.

System Architecture

Figure 3:
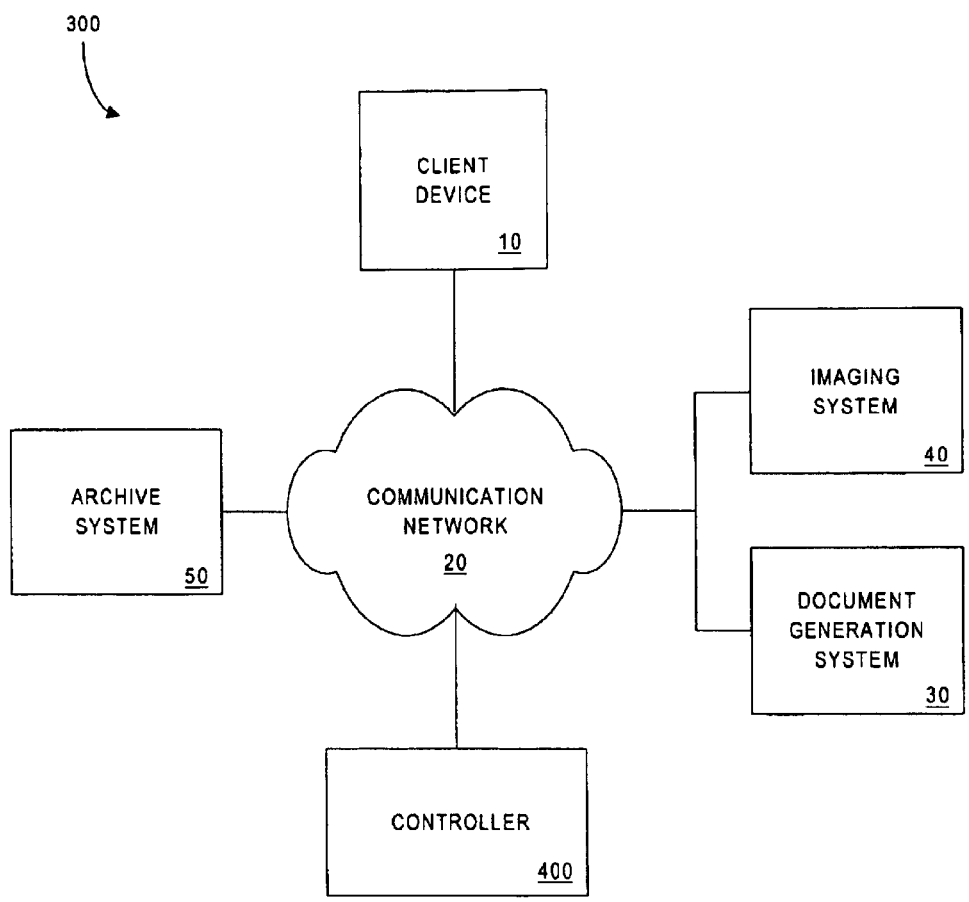
FIG. 3 is a block diagram overview of a data storage and retrieval system according to some embodiments of the present invention.

FIG. 3 is a block diagram overview of a data storage and retrieval system 300 according to another embodiment of the present invention. As in FIG. 1, controller 400 is in communication with client device 10. Further, controller 400 is in communication with satellite systems such as one or more document generation systems 30, one or more imaging systems 40 and one or more archival systems 50.

As used herein, devices (such as controller 400, client device 10, document generation system 30, imaging system 40, and archival system 50) may communicate via a communication network 20, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN (e.g., in accordance with the Institute of Electrical and Electronics Engineers 802.11 standard), a Bluetooth network, an Infrared Radiation (IR) network, and/or an IP network such as the Internet, an intranet or an extranet. As used herein, the term "communications" can refer to wired and/or wireless communications as appropriate. Note that the devices shown in FIG. 3 need not be in constant communication. For example, controller 400 may communicate with a client device 10 on an as-needed or periodic basis.

Although a single controller 400 is shown in FIG. 3, any number of controllers 400 may be included in the data storage and retrieval system 300. Similarly, any number of client devices 10, or any other device described herein, may be included in the data storage and retrieval system 300 according to embodiments of the present invention.

Controller 400, client devices 10, and satellite devices 30, 40 and 50 may be any devices capable of performing the various functions described herein. Client device 10 may be, for example: a Personal Computer (PC), a portable computing device (e.g., a laptop computer), a Personal Digital Assistant (PDA), or a dedicated data storage and retrieval system 300 terminal. Note that the client device 10 may be associated with a full-blown workstation application or a thin-client browser-based application. In one example environment, a business may utilize features of embodiments of the present invention over a corporate intranet, allowing access to individual employees operating personal computers configured as client devices 10. In this manner, a large number of users may access and store document information using the system.

According to some embodiments, client device 10 may, for example, control user functionality (e.g., by supporting applicable user interactions). Client device 10 may also perform session management (e.g., by providing user login and logout capability, managing a physical connection including a connection status notification to a user, and issuing a logout when appropriate). In some embodiments, client device 10 may be operated as a system administrator device enjoying greater system privileges than a standard user device. Those skilled in the art will recognize that a variety of different access and control privileges may be granted to different users accessing document information via system 300.

According to some embodiments, a user enters information associated with a document to be stored or retrieved via the client device 10. In embodiments where a user wishes to store document information, the user may be prompted to provide particular types and content of information to fully describe the document for future retrieval. In embodiments where a user wishes to retrieve a document, the user may be prompted to enter search information or other data inputs to enable retrieval of stored document information.

Information provided by the user is transmitted from client device 10 to controller 400 via communication network 20, and controller 400 may process the information to facilitate the storage or retrieval of document information. According to some embodiments, controller 400 is also in communication with one or more satellite systems, such as a document generation system 30, an imaging system 40, and an archive system 50, each of which may play a role in the storage and/or retrieval of document information. For example, in some embodiments, document information used to populate a document record may be automatically retrieved from information originally created by one or more document generation systems 30.

As a specific example, a legal department of a company may utilize an automated or partially automated system to generate contracts. According to embodiments of the present invention, this contract generation software interfaces with data storage and retrieval system 300 to generate a pending document record for each new contract generated by the contract generation software. This ensures that new documents created within the company are accurately and easily entered into system 300. Further, according to some embodiments, the record generated is a pending document record which may be completed or converted into an active document record after the contract has been completed (e.g., after the contract has been signed). Embodiments of the present invention may interface with any of a number of different document generation systems 30 to facilitate creation of new document records.

One or more imaging systems 40 may also be in communication with controller 400 via communication network 20. In some embodiments, a number of different imaging systems 40 may be provided, each distributed geographically to support the imaging needs of different locations of a business operating system 300. Any of a number of different imaging systems 40 may be used in conjunction with embodiments of the present invention. In one currently-preferred embodiment, imaging systems which allow the fast and accurate generation of Adobe Acrobat® portable document format (PDF) files is preferred. In some embodiments, software such as the Ascent Capture® software provided by Kofax® may be used to organize and permit distributed capture and manipulation of document images. In some embodiments, imaging systems 40 may also be provided with optical character recognition software which facilitates the conversion of document images into text files. According to some embodiments of the present invention, some or all of the imaging systems 40 in communication with controller 400 may be operated by third party service providers.

Archive system 50 may be one or more systems operated to control and track document archive information. For example, archive system 50 may be a system operated by, or on behalf of, an archival service provider such as Iron Mountain, Inc. of Boston, Mass. For example, archive system 50 may be used to maintain and update document archive information (such as storage box information, archive status, etc.) relating to documents which have been sent to an archival service for storage (and perhaps for later destruction). Embodiments of the present invention permit the data storage and retrieval system of the present invention to keep track of documents which have been forwarded to an archival service for custody. According to some embodiments, a user operating client device 10 may interact with the data storage and retrieval system 300 to request the return of a particular document from its storage location at an archival service. Further, an administrative user may operate client device 10 to input archival information regarding a particular document into a document record stored by controller 400. Other information may also be shared between controller 400, client device 10, and archival system 50.

Note that controller 400 may communicate with client device 10, document generation system 30, imaging system 40, and archive system 50 via a single communication network 20 or via different communication networks.

Figure 4:
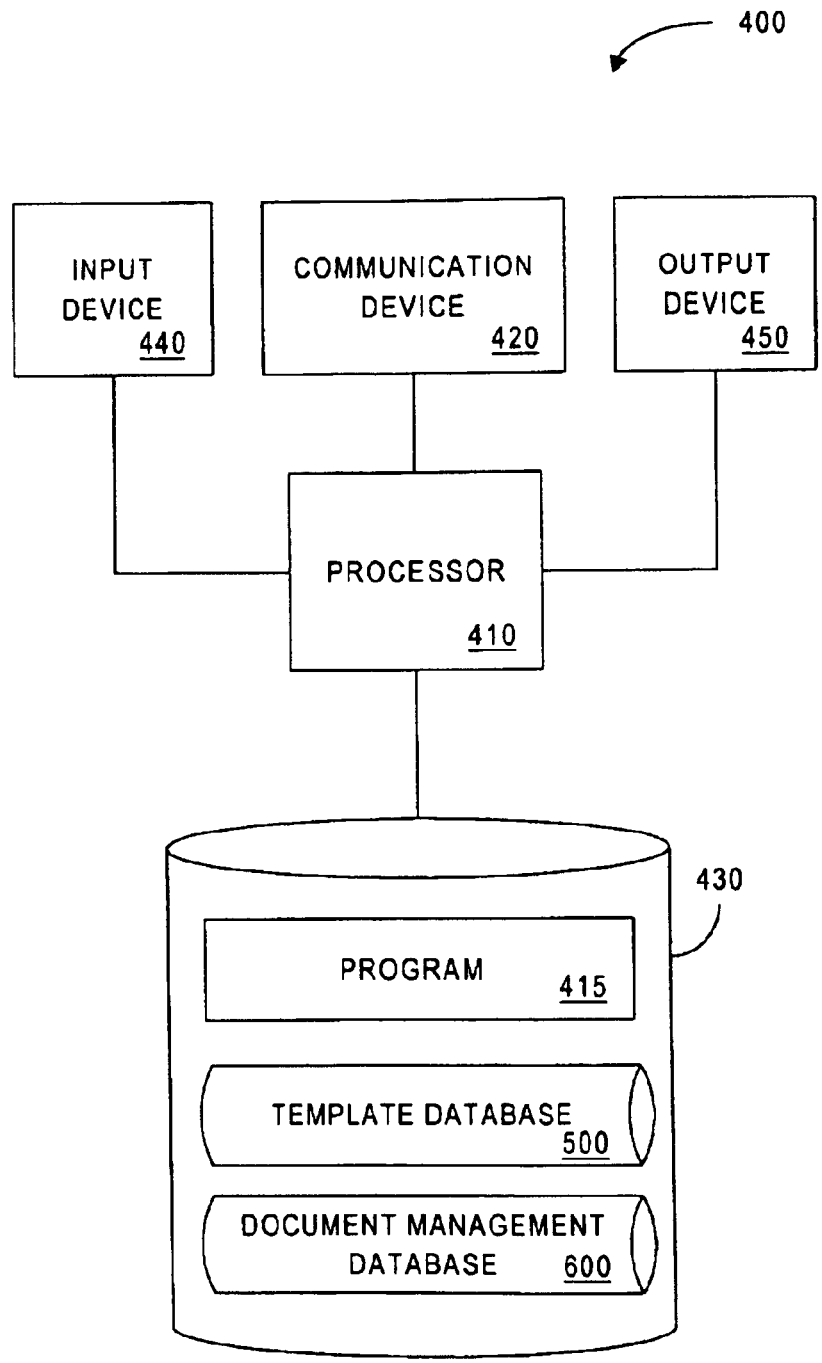
FIG. 4 is a block diagram of a data storage and retrieval system controller according to some embodiments of the present invention.

Referring now to FIG. 4, a more detailed view of data storage and retrieval system controller 400 is shown that is descriptive of the devices shown, for example, in FIGS. 1 and 3 according to some embodiments of the present invention. Controller 400 comprises a processor 410, such as one or more INTEL® Pentium® processors, coupled to a communication device 420 configured to communicate via a communication network (not shown in FIG. 4). Communication device 420 may be used to communicate, for example, with one or more client devices 10 and/or satellite devices (such as systems 30, 40 and 50).

Processor 410 is also in communication with an input device 440. Input device 440 may comprise, for example, a keyboard, a mouse or other pointing device, a microphone, knob or a switch, an IR port, a docking station, and/or a touch screen. Input device 440 may be used, for example, to enter information (e.g., information identifying a document to be stored or retrieved).

Processor 410 is also in communication with an output device 450. Output device 450 may comprise, for example, a display (e.g., a display screen), a speaker, and/or a printer. Output device 450 may be used, for example, to output information about a document to be stored or retrieved from the data storage and retrieval system.

Processor 410 is also in communication with a storage device 430. Storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 430 stores a program 415 for controlling processor 410. Processor 410 performs instructions of program 415, and thereby operates in accordance with the present invention. For example, processor 410 may receive document information, identify document templates, present document templates to users entering document information, search for and identify existing document information, search for and identify document images, etc.

Storage device 430 also stores databases, including a template database 500, and a document management database 600. These databases are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only; those skilled in the art will understand that the number and content of the entries can be different from those illustrated herein.

Databases

Referring now to FIG. 5, a table represents a template database 500 that may be stored at (or accessible by) controller 400. The table includes entries identifying a number of different templates which are available to prompt and otherwise control the input of document information by users operating client devices 10. The table also defines fields 502–506 for each of the entries. The fields specify: a template identifier 502, a collection name 504, and a file name 506. The information in template database 500 may be created and updated, for example, based on information received from a system administrator operating client device 10. For example, a system administrator, librarian, or other authorized user may generate, modify and store template information as needed.

Template identifier 502 may be, for example, an alphanumeric code associated with a particular document template which has been created for use in conjunction with system 300. Template identifier 502 may be generated by, for example, controller 400.

Collection name 504 may be, for example, information identifying one or more document collections with which the template identified by template identifier 502 is to be used. For example, in a system used to store and retrieve legal documentation, a variety of different collections may be established and utilized to accurately store and retrieve legal documents in a logical manner. As an illustrative example, documents may be categorized into collections such as: "AFFILIATES AND SUBSIDIARIES"; "AFFILIATES AND SUBSIDIARIES (Topical)"; "CONTRACTS"; "CONTRACTS—CONFIDENTIALITY AGREEMENTS"; "CONTRACTS—SOFTWARE AGREEMENTS"; "CONTRACTS—EMPLOYMENT AGREEMENTS"; "ATTACHMENTS, GARNISHMENTS, and LIENS", etc. Some or all of these collections may have specific data collection requirements which may be specified using one or more templates. As a result, users inputting new data into system 300 may be directed to enter data in a repeatable manner, allowing documents to be easily classified and retrieved. Other types of collections may also be used, such as, for example, "Contracts—Vendor", "Contracts—Soft Dollar Agreements" or any other document classification which may be used to sort documents.

File name 506 may be, for example, information identifying a file location of the template identified by template identifier 502. The template file may be in any of a number of different formats and the name may indicate a location on a network or in data storage device 430 and accessible to controller 400. According to some embodiments, when a user indicates a desire to input information about a new document, the user is asked to select a classification of the document. The classification selected may be used to retrieve the appropriate template file from template database 500. The template file may be presented as, for example, a form on client device 10 which prompts the user to input particular types of information as defined by the particular template.

In some embodiments, a default template may also be defined which may be presented to direct user input in cases where no other template identifier is appropriate or identifiable for particular document information to be entered by a user.

Referring now to FIG. 6, a table represents a document management database 600 that may be stored at (or accessible by) controller 400. The table includes entries identifying a number of different documents which have been entered into data storage and retrieval system 300. In some embodiments, data storage and retrieval system 300 may have separate databases for pending document entries and for active, or approved, document entries. In some embodiments, a single database may be used to store both types of entries, but pending records may be flagged or otherwise indicated as not having been finally approved for storage in the system. Document management database 600 includes a number of fields 602–620 for each of the entries. The fields specify: a record identifier 602, a collection name 604, a file name 606, a primary subcategory 608, a secondary subcategory 610, a tertiary subcategory 612, location information 614, creation information 616, a media type 618 and archive information 620.

The information in document management database 600 may be created and updated, for example, based on information received from a user operating client device 10. For example, a user may interact with controller 400 to enter document information into document management database 600. In some embodiments, the nature and extent of the data stored in document management database 600 may vary based on the type of document about which information is being entered. In some embodiments, the nature and extent of data stored may be governed by a template selected from template database 500 (FIG. 5) based on a classification of document about which information is to be entered. In some embodiments, records and fields of information in document management database 600 may be populated using data generated by, and forwarded from, one or more satellite systems, such as document generation system 30 (FIG. 3).

Record identifier 602 may be, for example, an alphanumeric code associated with a particular document for which information is stored. Record identifier 602 may be generated by, for example, controller 400 (e.g., new record identifiers may be assigned sequentially as new records are established).

Collection name 604 includes information identifying a particular collection which the document is associated. A number of different types of collections may be assigned and established to group and sort different types of documents. For example, in a company which generates a large number of legal and compliance documents, different collections may be established for different types of legal documents as well as different types of collections. Applicants have found that such sorting by collection allows more efficient identification and retrieval of documents.

File name 606 may include, for example, information identifying a name of the document stored using the system of the present invention. Different naming conventions may be provided based on the type of document. For example, for contracts generated by the legal department, the name of the contract may be the name of the entity with which the business has contracted or the name by which the contract is referred to. Other naming conventions may also be used to easily identify and locate information after it has been stored.

Primary, secondary, and tertiary subcategories 608–612 may include information used to categorize and locate each document. The particular type of data stored for each category may depend, in part, on the collection in which the document is associated with. For example, a document in the "CONTRACT" collection may require that the contracting party name be included in the file name field 606, the nature of the agreement may be stored in the primary subcategory 608, and further descriptive information about the agreement be stored in the secondary and tertiary subcategories 610, 612. Other types of categorization information may also be provided to facilitate ready identification and retrieval of documents stored in document management database 600.

Location information 614 may be, for example, information specified by a user operating client device 10 which specifies a particular location of the document associated with the record identified by record identifier 602. For example, location information 614 may include information specifying a business region, a department, an origin of the document, and the actual physical location of the document. This information may be used to help locate paper copies of documents stored and indexed using embodiments of the present invention. In some embodiments, where paper copies of the document have been sent to an archival unit, information may be provided particularly identifying the archival location so that the document could be readily retrieved from the archival location.

In some embodiments of the present invention, archival instructions for a particular document identified by a particular document record in database 600 may be forwarded to the appropriate archive system 50. For example, if an original document is stored by an archival service provider in their upstate New York warehouse, a user operating client device 10 may send the archival service provider explicit instructions about retrieving the document (including, for example, information identifying the location and the storage box number) so that the original document can be quickly and accurately delivered to the requesting user. In some embodiments, communication between system 300 and the archival service provider may be via electronic mail, the Internet, telephone, or the like.

Creation information 616 may be, for example, information identifying the entity and/or individual which created the document associated with record identifier 602. For example, information may be provided identifying the author of the document, the date the document was created, the date the record was opened, the status of the record (e.g., active, archived, closed, etc.). This information may be used to track status of the document and the record as well as to identify the origination of the document.

Media type 618 may be, for example, information identifying the types of media in which the document exists. For example, a document classified and stored using embodiments of the present invention may be stored as an image document (e.g., in PDF format or some other image format), a hard-copy document, or a combination of the two. In some embodiments, a text version of the document may also be stored (e.g., in a word processing format, ascii text, or the like). In some embodiments, a pointer to the location of the image or text version of the file may also be provided allowing ready access to the file. In some embodiments, media type 618 may be populated with information after a document record has been created, and even after the document record has been approved and transformed into an active record. For example, a document image may be generated some time after the original document record was created. According to embodiments of the present invention, the document image may be easily associated with the document record by referencing the record identifier 602 associated with the document record. In some embodiments, the document image may be named using the record identifier 602 as part of the document name, allowing ready association between the image and the record.

Archive information 620 may be, for example, information identifying archive status or location information for the document associated with record identifier 602. Archive information 620 may include, for example, information about the retention of a particular document (e.g., indicating a period of time for which the document will be maintained), a planned destroy date, a required destruction authorization, information about an archival service with which a document has been stored, etc. Other information useful or necessary to identify, locate, and maintain documents stored using embodiments of the present invention may also be provided.

Process Description

Figure 7:
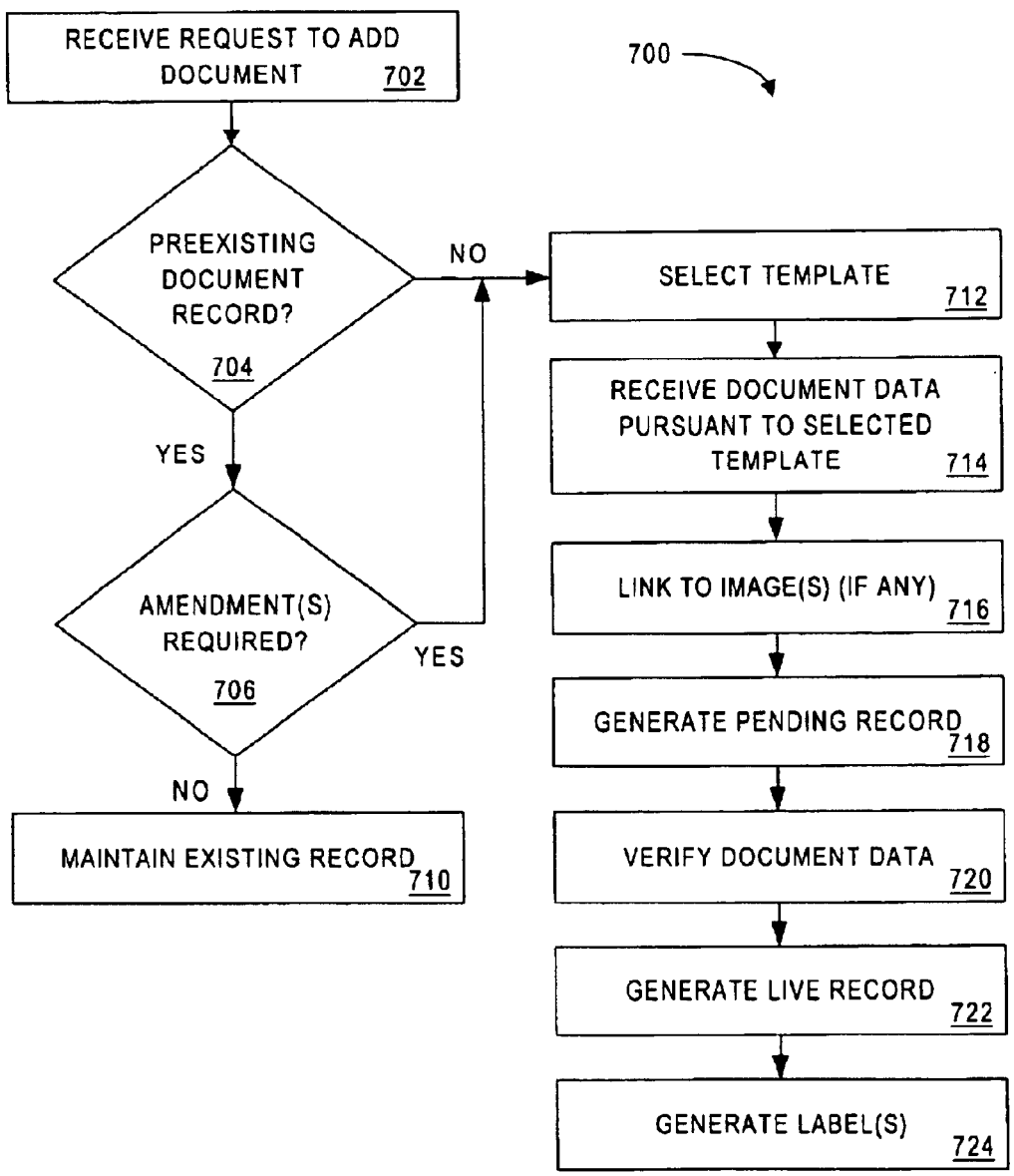
FIG. 7 is a flow chart of a method for storing information associated with a data storage and retrieval system according to some embodiments of the present invention.

Reference is now made to FIG. 7, where a flow chart 700 is shown which represents the operation of an embodiment of the present invention. The particular arrangement of elements in the flow chart of FIG. 7 is not meant to imply a fixed order to the steps; embodiments of the present invention can be practiced in any order that is practicable.

Flow chart 700 depicts a process for generating a document management database record (e.g., for storage in document management database 600 of FIG. 6). Flow chart 700 may be a process conducted between a user operating client device 10 and controller 400. The process begins at 702 where controller 400 receives a request to add a document to document management database 600. This request may be initiated by a user operating client device 10 or it may be initiated by a satellite system such as a document generation system 50 (FIG. 3). In some embodiments, the user operating client device 10 is a records management employee who is responding to a submission from a document owner or other individual.

In one embodiment, processing at 702 may involve a user pointing a browser of client device 10 to a network address of controller 400 to initiate a submission. Processing at 702 may involve the user submitting data indicating a request to add a document. The data may include data identifying a collection to which the document is to be added.

Processing continues at 704 where a determination is made whether a preexisting record exists for the document. This may entail, for example, prompting the user for further information about the document to enable a full search of the database to determine if the document has been previously stored in the database. If processing at 704 indicates that the document has previously had a record established, processing may continue to 706 where a determination is made whether the record requires an amendment. For example, in some situations, a document record may have been created which is now out of date (e.g., as the result of amendments or updates to the document, etc.). If no amendments are required, processing continues at 710 and the existing record is maintained without modification.

If an amendment is required, or if no preexisting document record is located within the system, processing continues to 712 where a template is selected to guide user data entry. In some embodiments of the present invention, different templates gathering different types of information may be selected based on the type of document involved. For example, a different template may be used to prompt user input about a document which is going to be categorized in the collection titled "CONTRACT—CONFIDENTIALITY AGREEMENT" than for a document to be placed in the collection titled "CONTRACT—SOFT DOLLAR AGREEMENT". In some embodiments, selection of the appropriate template may involve simply prompting the user to indicate the collection in which the document is to be placed.

Figure 9:
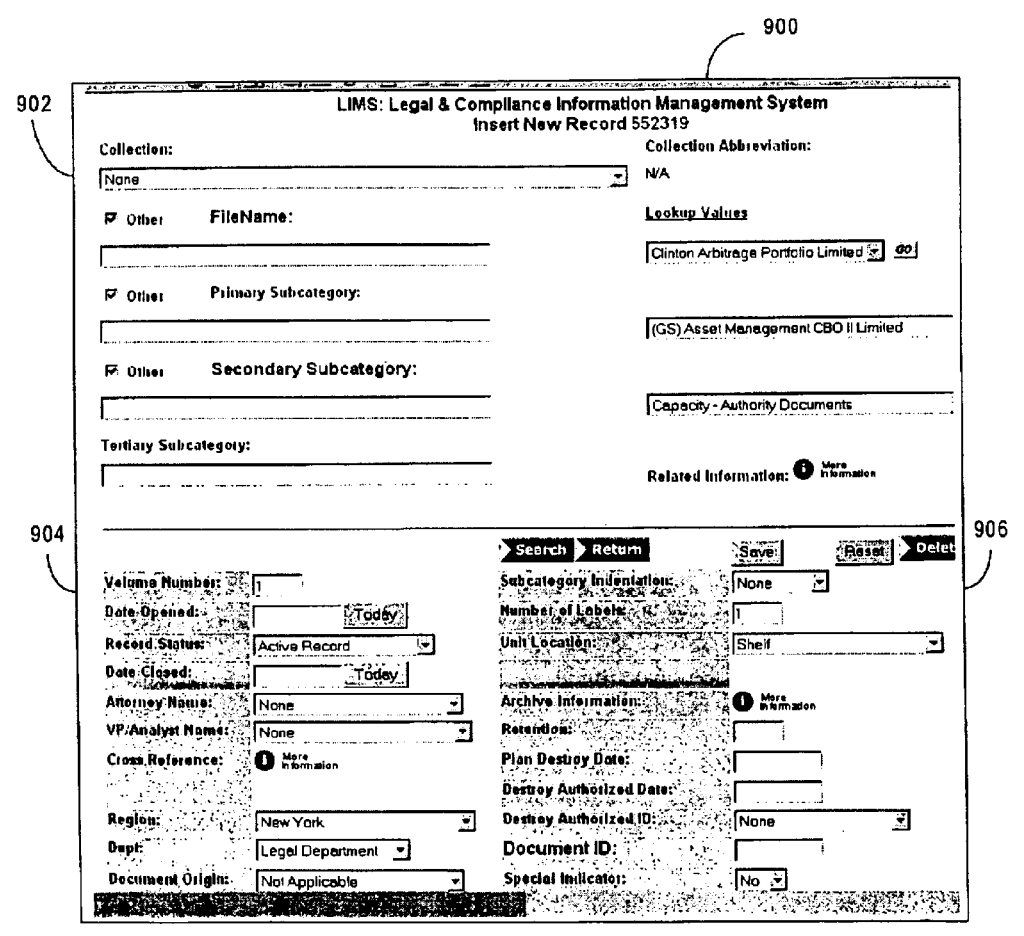

Processing continues at 714 where document data is received pursuant to the selected template. Once a template has been selected at 712, it is presented to a user to guide the user in entering information about the document. An example template is shown in FIG. 9 which will be discussed further below. A user operating client device 10 may enter document data requested by the selected template to provide detailed information about the document. Upon completion of the template, the user may submit the information by following instructions on the template (e.g., by selecting a "Submit" option on a menu or the like).

Processing continues at 716 where the user may link the document information provided at 714 with one or more document images (if any). In some embodiments, document images may be linked by simply associating the document images with record identifier 602 (FIG. 6) of the document management database. In some embodiments, document images may be generated in a separate process (e.g., after process 700 has been performed and a record identifier has been established for the document) and the images are associated with the document record created by process 700 by associating the images with the appropriate record identifier 602. In other embodiments, processing at 716 may involve inputting information identifying a location of pre-generated document images. In either event, an association between the document record and the document images is established such that a user may readily locate both. In some embodiments, processing at 716 may also include linking the document record with a text file of the record (which may be generated, e.g., using OCR software or the like).

Processing continues at 718 where a pending document record is generated which includes the information received at 714 and images (if any) linked at 716. According to some embodiments of the present invention, only active document records are available for searching and retrieval by users operating client devices 10. Prior to becoming an active document record, a pending record is generated and document data contained therein is verified. In some embodiments, the verification of data at 718 may include review by one or more records administrators responsible for maintaining the consistency and accuracy of data stored in the system. In some embodiments, the verification of data at 718 may include automated analysis of the record to detect errors or omitted items. For example, certain templates may have required fields that must contain data. If data is not contained in the fields, processing at 720 will indicate that the submitted data is missing information. If processing at 720 indicates that data of the pending record is not verified, a user may be prompted to reenter the information. In some embodiments, a records administrator may be able to override a negative determination at 720.

Once the data in the pending record have been verified, processing continues at 722 where a live or active record is generated. In some embodiments, this may simply entail switching a flag in the record to indicate that the record has been approved and is now an active record. In other embodiments, processing at 722 may entail moving the data from a pending database to an active database. Once the active record has been generated at 722, other users of the system may search and retrieve information contained in the new document record.

In some embodiments, processing may continue at 724 where one or more labels are generated based on information contained in the active document record. For example, a records administrator or other user operating a client device 10 may generate one or more labels to label a physical copy of the document or a file containing the physical copy of the document. A variety of different formats and types of labels may be generated, depending on the location of the user and the location of the file. In some embodiments, labels will automatically be generated for new documents based on information in document management database 600. Label formats may vary based on the location of the physical document (e.g., files located in one office may be stored in lateral hanging folders, while files located in another office may be stored in buff folders; each may require a separate label format which is automatically generated based on information in database 600). According to some embodiments of the present invention, system 300 may automatically select the appropriate label format based on the location of the document or other information about the document contained within document management database 600.

Figure 8:
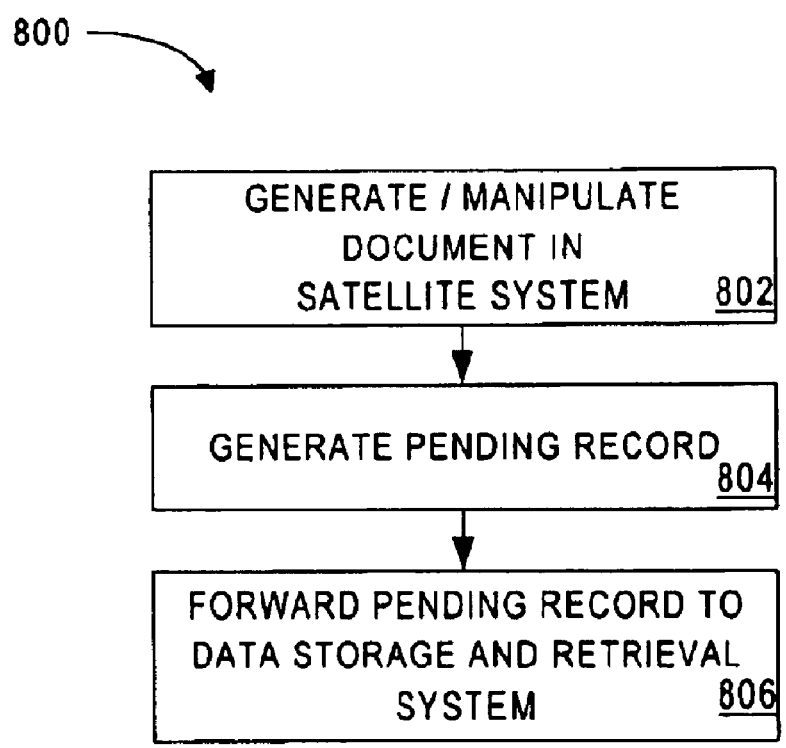
FIG. 8 is a flow chart of a method for generating pending records from external systems in communication with a data storage and retrieval system according to some embodiments of the present invention.

Referring now to FIG. 8, a process 800 is shown for generating a pending record in document management database 600 from a satellite system (such as, for example, document generation system 30 of FIG. 3). According to some embodiments of the present invention, the document imaging and retrieval system may interface with a number of legacy systems and other satellite systems which are used to create, manage, or otherwise manipulate documents. One example of such a satellite system is a document generation system such as a contract authoring or generation system. According to some embodiments of the present invention, when a document is generated by document generation system 30, a pending record in document management database 600 is also generated. As a result, data entry is reduced thereby reducing potential errors and costs.

Process 800 begins at 802 where a document is generated or otherwise manipulated in a satellite system. In an example where the satellite system is a contract authoring tool, processing at 802 may involve a user operating the contract authoring tool to generate a new contract document.

Processing continues at 804 where, pursuant to embodiments of the present invention, information from the contract authoring tool is used to generate a pending record identifying the new document. This pending record may be generated with data used to populate a new record of document management database 600. In some embodiments, the pending record generated by the satellite system is in a common format (e.g., comma delimited text, text, or the like). In other embodiments, the pending record is generated in a format used by document management database 600. In other embodiments, the pending record is generated in a format of the satellite system which is later translated into a format used by document management database 600. As a result, embodiments of the present invention may receive data from a variety of different types of satellite systems. By generating pending records with data from these systems, the time, expense, and potential errors associated with reentering the data is avoided.

Once the pending record is generated at 804, the pending record is forwarded to the data storage and retrieval system for entry in document management database 600. Once the document is finalized, the record may be transformed into an active record (e.g., as described above in conjunction with the description of FIG. 7). Active records may be amended, augmented, and otherwise modified by authorized users. For example, an active record may be amended to refer to a later-created image file or to indicate updated archival information or status data.

Referring now to FIG. 9, a example user interface 900 is shown of a template according to some embodiments of the present invention. User interface 900 may be displayed on a display unit of client device 10 to direct a user to enter particular types of data to create a new document record for entry in document management database 600. As shown, user interface 900 includes a plurality of different fields, including fields in areas 902, 904 and 906. Area 902 includes fields used to prompt a user to enter classification and searchable information about the document, including a primary collection with which the document is to be associated (which may be selected from a drop-down list of collections); a filename; and one or more categories which may be used to identify the document. A user submitting a new document (or a records administrator entering information about a new document) may interact with user interface 900 and input document information into these fields to facilitate later retrieval of the document.

User interface 900 also includes an area 902 which includes fields prompting a user to enter data about the creation of the document (e.g., the date opened, the attorney name, the VP/analyst name, the region, department and document origin, etc.) which may be useful in locating and understanding the document. Area 904 includes fields prompting a user to enter data about archive information, label information, and location information. Other information may also be solicited from an individual entering data regarding a document to be entered into the system.

Other types and configurations of user interfaces may also be used in conjunction with embodiments of the present invention to solicit information, to facilitate searching, and to manage documents stored within the system as well.

Although the present invention has been described with respect to a preferred embodiment thereof, those skilled in the art will note that various substitutions may be made to those embodiments described herein without departing from the spirit and scope of the present invention.

What is claimed is:

1. A method for storing a document, comprising:
   conducting a search for existing records of a record management system referencing said document;
   submitting a request to add said document to said record management system if said search indicates that said document is not referenced in said record management system, said request identifying at least a type of said document;
   entering document data in a data entry template, said data entry template directing a user to enter data, said data entry template selected based at least in part on said type of said document; and
   associating said data from said data entry template with an image of said document.

2. The method of claim 1, further comprising:
   displaying said data entry template to said user.

3. The method of claim 1, further comprising:
   forwarding said document data to a document management database, said document management database storing said document data in a document record.

4. The method of claim 3, wherein said image of said document is associated with said document record.

5. The method of claim 4, wherein said document image is associated with said document record based on a record identifier of said document record.

6. A data storage method, comprising:
   identifying a template based on a classification of a document to be stored, said template directing a user to enter data;
   receiving document information associated with said document, said document information including said data entered by said user;
   generating a pending record containing said document information;
   associating said pending record containing said document information with an image of said document;
   verifying said document information; and
   generating an active record if said verifying is successful, said active record available for searching and retrieval by a user.

7. The data storage method of claim 6, wherein said template is selected from among a library of available templates.

8. The data storage method of claim 6, wherein said classification is a document collection classification.

9. The data storage method of claim 6, further comprising:
   determining if said document has previously been stored.

10. The data storage method of claim 6, wherein said template defines a plurality of data elements required to identify a document according to said classification.

11. The data storage method of claim 10, further comprising:
    receiving document data corresponding to each of said plurality of data elements prior to generating said pending record.

12. The data storage method of claim 6, wherein said associating includes referencing a document record identifier in both said pending record and said image.

13. The data storage method of claim 6, further comprising:
    associating said active record with an image of said document.

14. The data storage method of claim 6, wherein said document information includes at least one of: a collection name; a file name; category information; location information; owner information; creator information; cross reference information; status information; history information; geographical information; and archive information.

15. The data storage method of claim 6, further comprising:
    storing said pending record in a document management database; and
    storing an indicator with said pending record indicating that it has not yet been approved.

16. The data storage method of claim 15, further comprising:
    modifying said indicator upon approval of said pending record, thereby converting said pending record into said active record.

17. The data storage method of claim 15, wherein access to said pending records in said document management database is limited to authorized reviewers operating client devices.

18. The data storage method of claim 6, wherein said receiving document information further comprises:
    receiving document information from an external system used to generate said document.

19. The data storage method of claim 6, further comprising:
    displaying said template to said user.

20. A data storage system, comprising:
    means for identifying a template based on a classification of a document to be stored, said template directing a user to enter data;

means for receiving from said user document information associated with said document, said document information including said data entered by said user;

means for generating a pending record containing said document information;

means for associating said pending record containing said document information with an electronic representation of said document;

means for verifying said document information; and means for generating an active record if said verifying is successful, said active record available for searching and retrieval by a user.

21. The data storage system of claim 20, further comprising:

means for displaying said template to said user.

22. A computer-readable medium having computer-executable instructions for performing steps comprising:

identifying a template based on a classification of a document to be stored, said template directing a user to enter data;

receiving from said user document information associated with said document, said document information including said data entered by said user;

generating a pending record containing said document information;

associating said pending record containing said document information with an electronic representation of said document;

verifying said document information; and generating an active record if said verifying is successful, said active record available for searching and retrieval by a user.

23. The computer-readable medium of claim 22, wherein the computer-executable instructions are also for:

displaying said template to said user.

24. A data storage apparatus, comprising:

a processor;

a communications device, in communication with said processor, receiving data; and a memory unit in communication with said processor and storing a program, wherein the processor is operative with the program to:

identify a template based on a classification of a document to be stored, said template directing a user to enter data;

receive from said user document information associated with said document, said document information including said data entered by said user;

generate a pending record containing said document information;

associate said pending record containing said document information with an electronic representation of said document;

verify said document information; and generate an active record if said verifying is successful, said active record available for searching and retrieval by a user.

25. The data storage system of claim 24, further comprising:

a display unit;

and wherein said processor is operative with the program and with the display unit to display said template to said user.

\* \* \* \* \*